United States Patent [19]

Elsea, Jr.

[11] 4,007,594

[45] Feb. 15, 1977

[54] AUTOMOTIVE DRIVE SYSTEM SUMMING MULTIPLE INDEPENDENT DRIVES IN THE DIFFERENTIAL HOUSING

[76] Inventor: John W. Elsea, Jr., Rte. 2, Box 121-A, Laceys Spring, Ala. 35754

[22] Filed: July 30, 1974

[21] Appl. No.: 493,172

[52] U.S. Cl. .................................. 60/618; 60/718; 74/661; 74/665 L

[51] Int. Cl.² .................. F01K 23/10; F16H 37/06

[58] Field of Search ............. 60/39.18 B, 618, 718, 60/716; 74/675, 665 L, 665 M, 665 N, 661, 665 P

[56] References Cited

UNITED STATES PATENTS

| | | | |
|---|---|---|---|
| 707,230 | 8/1902 | Henry | 74/661 |
| 912,567 | 2/1909 | Hess | 60/618 |
| 967,698 | 8/1910 | Wray | 74/710 |
| 1,033,511 | 7/1912 | Zimmerman | 74/710 |
| 1,339,177 | 5/1920 | Dyer | 60/618 |
| 1,996,579 | 4/1935 | Johnstone et al. | 74/675 |
| 2,589,788 | 3/1952 | Fell | 60/718 X |
| 2,737,014 | 3/1956 | Bush | 60/618 |
| 3,177,659 | 4/1965 | Berman | 60/39.18 B |
| 3,386,694 | 6/1968 | Boyle | 74/675 X |

*Primary Examiner*—Carlton R. Croyle
*Assistant Examiner*—Thomas I. Ross
*Attorney, Agent, or Firm*—C. A. Phillips

[57] ABSTRACT

An auxiliary automotive drive system consisting of a steam engine coupled through a clutch to an auxiliary pinion gear of a differential assembly to the drive wheels of an automobile.

4 Claims, 1 Drawing Figure

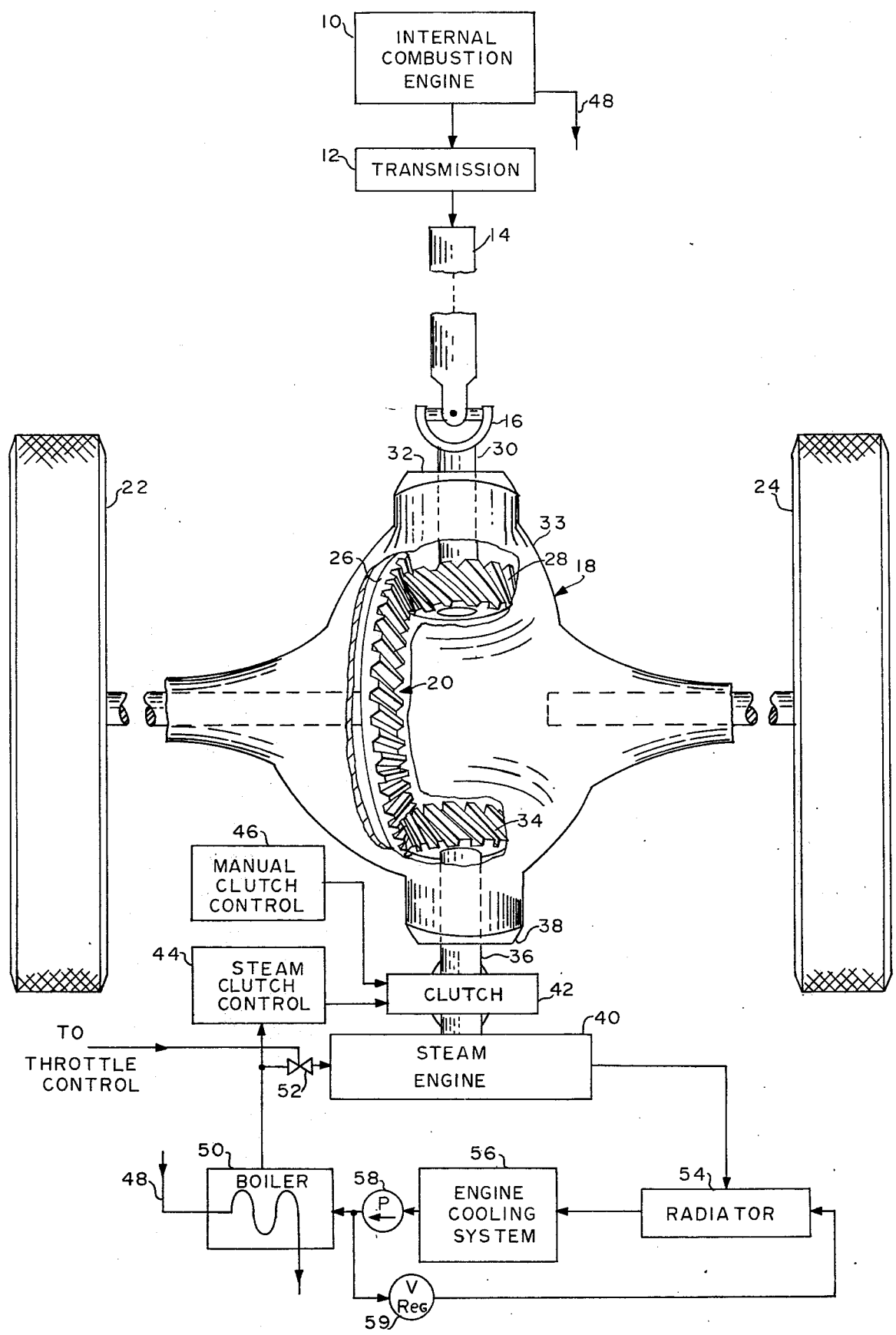

AUTOMOTIVE DRIVE SYSTEM SUMMING MULTIPLE INDEPENDENT DRIVES IN THE DIFFERENTIAL HOUSING

BACKGROUND OF THE INVENTION

1. Field of the Invention

This invention relates to automotive drive systems, and particularly to a steam-powered system adapted to derive energy from the exhaust system and provide auxiliary power to an otherwise gasoline-powered automobile.

2. State of the Prior Art

Various attempts have been made to employ the waste heat from the exhaust gases of an internal combustion engine to power an auxiliary engine, such as the steam engine, to improve overall fuel efficiency of an automotive vehicle. It is believed that a principal difficulty has been the lack of a practical means of coupling the auxiliary power to the drive wheels of the vehicle. A further problem would appear to have been the determination of an effective and efficient auxiliary power source.

SUMMARY OF THE INVENTION

In accordance with the invention, a steam propulsion system powered from exhaust gases from an internal combustion engine is coupled to the drive train of an automotive vehicle by means of an auxiliary pinion gear coupled to the ring gear of a differential assembly powering drive wheels. As a further aspect of the invention, the cooling system for the internal combustion engine functions to provide means for condensing the fluid output of the steam engine and for providing preheat to a boiler liquid for the steam propulsion system.

BRIEF DESCRIPTION OF THE DRAWING

The single drawing consists of a partial pictorial view of one portion of an automotive drive system and schematic illustration of the balance of the drive system.

DETAILED DESCRIPTION OF THE DRAWING

The present invention contemplates the employment of a conventional liquid-cooled internal combustion engine 10 with the output of that engine being supplied through conventional transmission 12 to drive shaft 14 and universal joint 16. The present invention contemplates a differential drive assembly 18 having a conventional differential gear assembly 20, through which wheels 22 and 24 are powered through application of torque to ring gear 26. Pinion 28, attached to shaft 30, is conventionally driven through universal joint 16. Shaft 30 is supported by end bearing 32 in housing 33. Differential assembly 18 differs from the conventional assembly in that additional pinion gear 34 drives ring gear 26; the pinion gear 34, being rigidly attached to shaft 36 and supported in housing 33 by bearing 38. Pinion gear 34 is driven by steam engine 40 through clutch 42, which is selectively energized when steam pressure of a selected value is sensed by steam clutch control 44 as being present in boiler 50. Such a clutch control comprises a piston assembly operating a conventional clutch lever. Alternately, the clutch may be operated (as illustrated) by manual control 46.

Steam is produced by exhaust gases flowing through line 48 and heating boiler 50. The resulting steam is fed through throttle valve 52 (operated remotely by means, not shown) to steam engine 40, which engine can be either of the reciprocating, turbine, or other rotary type. The wet steam output from steam engine 40 is supplied to a conventional-type radiator 54, which utilizes cooling air to fully condense the steam. The resulting liquid is fed to engine-cooling system 56 where it absorbs engine heat, cooling internal combustion engine 10, and preheating the liquid after which a portion of the liquid is pumped into boiler 50 as needed (a conventional liquid level valve, not shown, would control this input). The remainder of the liquid is circulated back through check valve 59 to radiator 54. It is contemplated that some of the liquid output of cooling system 56 will not be needed (the amount would be dependent upon demand for power from boiler 50) by boiler 50 and yet there must be continuous circulation through engine-cooling system 56.

Boiler 50 finally heats the input liquid from exhaust gases to produce steam, which steam is, in turn, supplied to steam engine 40. Steam engine 40 provides an auxiliary power source to drive wheels 22 and 24 and thus supplements the power drive from internal combustion engine 10. By using waste from exhaust 48, the added power provided by the steam engine is essentially produced without the expenditure of additional fuel, and thus the overall efficiency of the drive system is vastly improved.

What is claimed is:

1. An automotive drive system comprising:
   a differential housing and ring gear rotatably mounted therein;
   a differential gear assembly attached to said ring gear and including gear means for differentially driving a pair of axles;
   bearing means supported by said housing and comprising bearings on opposite sides of said housing;
   first and second discrete shafts, each supported by a said bearing means and extending through said housing;
   a first pinion gear rigidly attached to said first shaft and positioned to engage and drive said ring gear and a second pinion gear rigidly attached to said second shaft and positioned to engage and drive said ring gear;
   an internal combustion engine and means coupled to said engine for rotatably driving said first shaft; and
   a steam engine and means coupled to said steam engine for driving said second shaft.

2. An automotive drive system as set forth in claim 1 further comprising steam generating means to receive heat from the exhaust of said internal combustion engine and for generating steam and providing steam to said steam engine.

3. An automotive drive system as set forth in claim 2 further comprising clutch means responsive to said steam generating means and the presence of steam pressure for selectively coupling said steam engine to said second shaft.

4. An automotive drive system as set forth in claim 3 wherein said internal combustion engine includes a liquid-containing engine cooling jacket and an automotive radiator and said drive system comprises a closed liquid-vapor loop in turn comprising:
   said boiler;
   said steam engine;
   said radiator;
   said engine cooling jacket;
   a pump; and wherein:

an input of said radiator is connected to an exhaust output of said steam engine, an input of said engine cooling jacket is connected to an output of said radiator, and an output of said engine cooling jacket is connected to an input of said pump, an output of said pump is connected to an input of said boiler and to an input of said radiator, and an output of said boiler is connected to an input of said steam engine, whereby said radiator condenses wet steam output from said steam engine into a liquid, said liquid is preheated by said engine cooling jacket and pumped into said boiler where it is converted into steam and supplied to said steam engine.

\* \* \* \* \*